(12) United States Patent
Youngquist

(10) Patent No.: US 6,650,125 B1
(45) Date of Patent: Nov. 18, 2003

(54) LEAK AND PIPE DETECTION METHOD AND SYSTEM

(75) Inventor: Robert C. Youngquist, Cocoa, FL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 60 days.

(21) Appl. No.: 10/007,487

(22) Filed: Dec. 6, 2001

(51) Int. Cl.[7] .............................................. G01R 27/26
(52) U.S. Cl. ...................................... 324/658; 324/559
(58) Field of Search ................................ 324/559, 678, 324/66, 686, 444, 447, 519, 522, 710, 713, 718, 658, 664, 689; 73/40, 592; 340/605

(56) References Cited

U.S. PATENT DOCUMENTS

| | | |
|---|---|---|
| 3,991,363 A | 11/1976 | Lathrop |
| 4,101,827 A | 7/1978 | Offner |
| 4,377,783 A * | 3/1983 | Wagner ...................... 324/664 |
| 4,458,204 A | 7/1984 | Weber |
| 4,565,965 A | 1/1986 | Geesen |
| 4,600,356 A | 7/1986 | Bridges et al. |
| 4,689,552 A | 8/1987 | Fujii et al. |
| 4,706,031 A | 11/1987 | Michiguchi et al. |
| 4,719,407 A | 1/1988 | Converse et al. |
| 4,771,246 A | 9/1988 | Boryta et al. |
| 4,839,601 A | 6/1989 | Cotterell et al. |
| 4,843,324 A | 6/1989 | Humphreys, Jr. et al. |
| 5,126,654 A | 6/1992 | Murphy et al. |
| 5,159,276 A | 10/1992 | Reddy, III |
| 5,194,812 A | 3/1993 | Yokoi |
| 5,357,202 A | 10/1994 | Henderson |
| 5,537,045 A | 7/1996 | Henderson |
| 5,640,096 A | 6/1997 | Alm |
| 5,661,406 A | 8/1997 | Daily et al. |
| 5,773,984 A | 6/1998 | Suyama et al. |
| 6,008,657 A | 12/1999 | Suyama et al. |
| 6,051,977 A | 4/2000 | Masuda et al. |
| 6,097,189 A | 8/2000 | Arndt et al. |
| 6,252,538 B1 | 6/2001 | Chignell |

* cited by examiner

Primary Examiner—N. Le
Assistant Examiner—Amy He
(74) Attorney, Agent, or Firm—Randall M. Heald; Gary G. Borda; John G. Mannix

(57) ABSTRACT

A method and system for locating leaks of conductive fluids from non-conductive pipes and other structures or for locating non-conductive pipes or structures having conductive fluid contained therein, employ a charge generator to apply a time varying charge to the conductive fluid, and a capacitive type detector that can detect the variable charge that is induced in the fluid. The capacitive detector, which preferably includes a handheld housing, employs a large conductive pickup plate that is used to locate the pipe or leak by scanning the plate over the ground and detecting the induced charge that is generated when the plate comes in close proximity to the pipe or leak. If a leak is encountered, the resulting signal will appear over an area larger than expected for a buried pipe, assuming the leak provides an electrically conductive path between the flow and the wet surrounding ground. The detector uses any suitable type of indicator device, such as a pair of headphones that enable an operator to hear the detected signal as a chirping sound, for example.

20 Claims, 1 Drawing Sheet

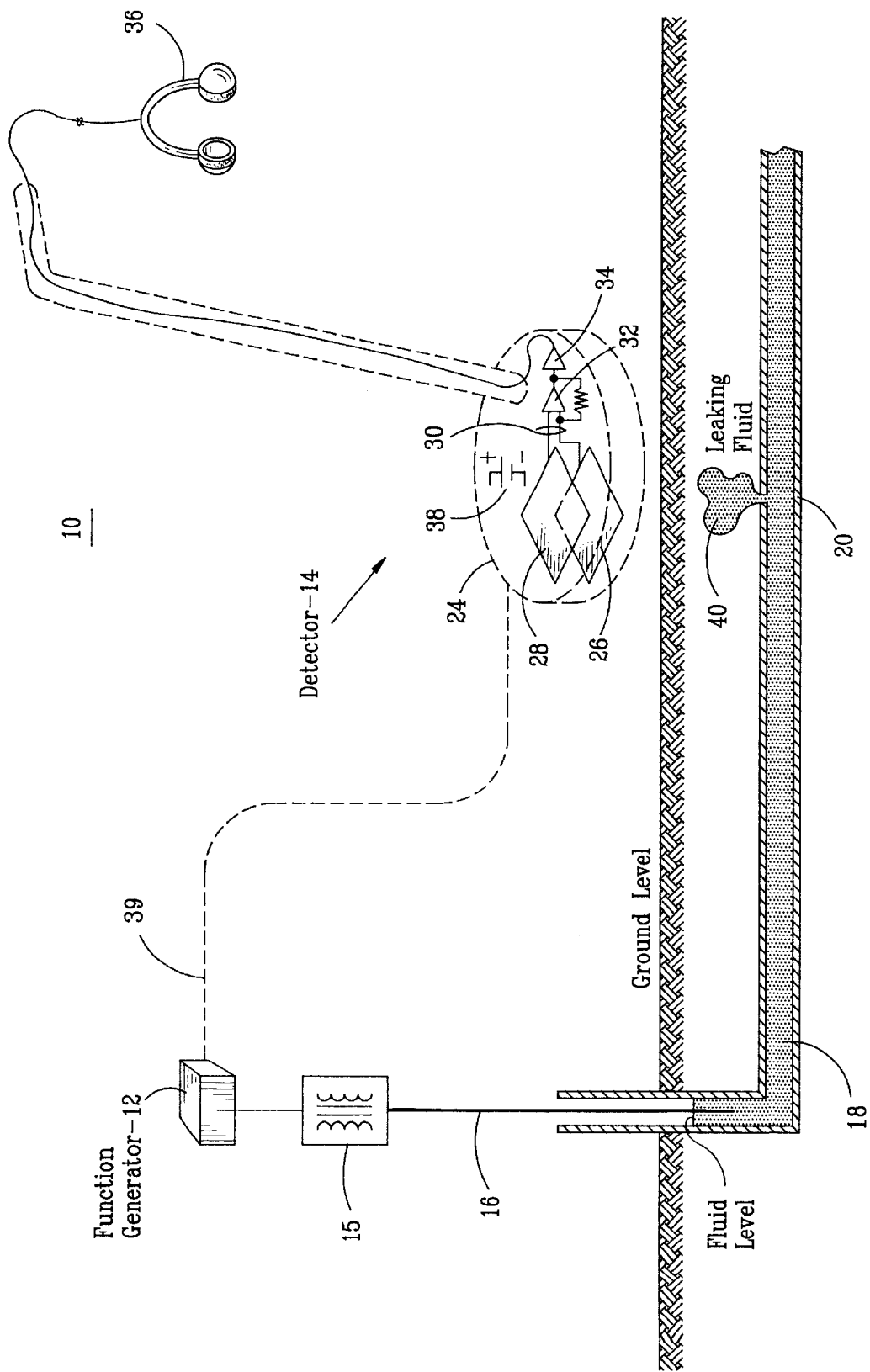

LEAK AND PIPE DETECTION METHOD AND SYSTEM

ORIGIN OF THE INVENTION

The invention described herein was made by an employee of the United States Government, and may be manufactured and used by and for the Government for Government purposes without the payment of any royalties thereon of therefor.

BACKGROUND OF THE INVENTION

1. Field of the Invention

The present invention relates in general to method and system for locating leaks of conductive fluid, such as ionized water, from non-conductive structures, such as pipes, as well as for detecting non-conductive structures having a conductive fluid contained or flowing therein.

2. Description of the Background Art

At present, there are a number of techniques for locating underground or hidden pipes, fluid leaks and the like. Examples of such techniques include acoustic, ultrasonic, radar and electronic signal detection methods. For example, microphones can be employed to listen for the dripping sound of a leak. Similarly, ultrasonic microphones can be used to listen for ultrasonic sounds that are generated by compressed gas leaking through very small holes in a pipe, for example. Radar can be employed to detect reflections from a buried pipe and thereby determine its location. Other pipe or leak detection methods employ systems that can detect electrical signals that are generated in the area of a pipe or a leak. For example, where a leaking fluid to be detected is conductive, such as ionized water, one known technique charges the conductive fluid to some voltage and then measures the voltage of the ground at various points until the highest voltage is found, which would be the point closest to the leak. However, this system assumes that the surrounding ground is conductive and requires actual contact with the ground to measure voltage. Other systems monitor the resistivity of the ground in the vicinity of a buried pipe, for example, to detect whether a leak has occurred. Again, such systems require actual contact of probes or the like with the ground.

All of the foregoing approaches can be time consuming and are often too expensive and/or complex for use in detecting pipes or leaks in residential environments, for example. Examples of such applications include detection of a swimming pool leak, or detection of sprinkler, watering or chilled water lines. An inexpensive alternative would be desirable for locating leaks and pipes in these and other situations where a conductive fluid is contained in or flowing inside of a non-conductive pipe or other structure.

SUMMARY OF THE INVENTION

To address the foregoing need, the present invention provides a method and system for locating leaks of conductive fluids from non-conductive structures, such as pipes, which employs a simple, inexpensive electrical signal generation and detection technique. The invention can also be used to locate non-conductive pipes or other structures themselves, where they contain a conductive fluid. The system comprises two main elements: a charge generator, such as a modulated source of voltage, which is employed to charge and discharge the conductive fluid in a time varying manner, and a capacitive type detector that can detect the variable charge that is induced in the fluid. According to the electrical theory of capacitance, as the fluid in the pipe is varied in voltage, the charged fluid induces a similar charge or voltage variation in any nearby conductors. To take advantage of this fundamental principle, the capacitive detector, which includes a large conductive pickup plate, is used to locate the pipe or leak by scanning the plate over an area where the pipe or leak is believed to be present, and detecting an induced charge that is generated when the plate comes in close proximity to the pipe or leak. However, it is important that the fluid carrying pipe not also be conductive, for if it were, the charge applied to the fluid would spread through the pipe into the surrounding ground, thus preventing the requisite charging of the fluid.

In a preferred embodiment, the charge generator is a function generator that is set to ramp through a set of variable voltage low frequency audio signals about once or twice a second and thereby generates a series of "chirps." The resulting signal is applied to the fluid in the pipe, whose location is to be detected, by connecting the output of the function generator via an electrical line to a spigot or fitting, or by dropping the electrical line into the fluid at any suitable accessible location. The varying voltage of the chirped signal charges and discharges the fluid in the pipe, which can be detected by the pickup plate in the detector if the plate is held in close proximity, e.g., within 10 feet, to the pipe. In addition, if a leak is encountered, the resulting signal will appear over an area larger than expected for a buried pipe, assuming the leak provides an electrically conductive path between the flow and the wet surrounding ground.

The detector is preferably a handheld device that is designed much like a conventional metal detector, for example, and can be used to scan the ground or other area for a buried pipe, leak or other structure. In the detector, the charge induced on the pickup plate by the varying charge in the fluid is preferably amplified and then used to actuate any suitable type of indicator device, such as pair of headphones that enable an operator to hear the modulated signal as a chirping sound, for example.

The primary application of the invention is for locating water leaks in commercial, residential and industrial settings where PVC, which, is electrically insulating, is being used as the pipe material, as well as for locating the PVC pipes themselves. However, the invention can be used with any type of electrically insulating pipe material. It should also be noted that while pure water is not conductive, in the vast majority of cases compounds are added to water, which ionizes it and makes it sufficiently conductive for the invention to work. The invention allows a user to trace the location of buried pipes containing a conductive substance such as water over distances of potentially two or three hundred feet from the point at which the signal is applied to the fluid.

BRIEF DESCRIPTION OF THE DRAWINGS

The features and advantages of the present invention will be come apparent from the following detailed description of a preferred embodiment thereof, taken in conjunction with the accompanying sole drawing FIGURE, which is a schematic block diagram of an underground pipe and leak locating system that is constructed in accordance with a preferred embodiment of the invention.

DETAILED DESCRIPTION OF A PREFERRED EMBODIMENT

With reference to the drawing figure, a pipe and leak locating system 10 is illustrated that is employed to locate a pipe or a leak that is buried or hidden below the surface of the ground. It should be understood, however, that the system 10 could be employed to locate a leak or pipe in any other location as well. In addition, the system 10 can be used to locate any non-conductive structure that contains a conductive fluid to which a variable charge can be applied.

The system 10 comprises two main elements a charge generator, such as a function generator 12, and a charge detector 14. The function generator 12, which can be any type of generator that is capable of generating a time varying voltage signal, applies a low frequency (e.g., in the audible range) time varying voltage signal through a small transformer 15 and a wire 16 to a column of conductive fluid 18 in a buried non-conductive pipe or line 20, whose location is to be determined. As an example, the function generator 12 can be set to ramp through a set of low frequency audio "chirp" signals about once or twice a second. This type of signal is particularly suited to use with a detector having an audio output indicator device because a chirp signal contains multiple frequency components that enable the signal to be readily sensed by the human ear. It should be noted, however, that the invention could also work with the function generator 12 generating a single frequency output signal. As for the frequency of the chirped signal, if the fluid 18 were highly conductive like an electrical cable, a high frequency signal could be used which is preferable for localization, but this is not possible where the conductive fluid 18 is ionized water, for example. Water lines have fairly poor conductivities, leading to resistances in the Megaohm region. Consequently, the time to charge and discharge the fluid column 18, if formed of water, is fairly long and limits the frequencies used to the audio regime (low kilohertz). Thus, in the water case, where low frequency is being used, the electrical situation is better modeled by treating the fluid column 18 and the detector 14 as the two conductors in a capacitor as will be discussed in greater detail later.

The transformer 15 is employed to raise the output voltage to 200–300 volts, but at low current. The output from the transformer 15 is connected to the fluid column 18 in the pipe 20 in any suitable manner, such as by immersing an end of the wire 16 in the fluid 18 as shown. Alternatively, the wire 16 can be attached to any conductive member that is in contact with the fluid 18, such as a spigot or pipe fitting (not shown), for example.

When the variable voltage is applied to the fluid 18 in the foregoing manner, the fluid 18 is repeatedly charged and discharged, thus creating a detectable signal that allows the pipe's location to be detected. In addition, if a leak is encountered, the resulting signal will appear over a large area, assuming that the leak provides an electrically conductive path between the flow and the wet surrounding ground. It should be noted that the pipe 20 cannot also be conductive, for if it were, the charge applied to the fluid 18 would spread through the pipe 20 into the surrounding ground, thus preventing the requisite charging of the fluid 18.

The detector 14 includes a housing 24, which is preferably portable and designed to be handheld, much like a conventional metal detector, for example. The housing 24 contains a number of electrical elements including a pickup plate 26, which is preferably flat, of a substantial size, such as 8×12 inches, is formed of a conductive material, e.g., metal, and thus acts as a capacitor plate when positioned in close proximity to a charged conductive material, such as the fluid 18 in the pipe 20. The size and shape of the pickup plate 26 can be varied, but use of a large, flat rectangular plate helps increase detection sensitivity of the detector 14 and should enable the detector 14 to detect a varying charge in a conductive fluid within about 3 to 10 feet of the pickup plate 26. Preferably, a second, ground plane plate 28, which can be similar in construction to the pickup plate 26, is also disposed in the housing 24 that is spaced from and parallel to the pickup plate 26. The ground plane plate 28 acts to shield one side of the pickup plate 26 from other sources of charge. This provides the detector 14 with directionality so that it will only respond to charge detected on one side of the pickup plate 26.

Both of the plates 26 and 28 are connected via a pair of wires 30 to a conventional current-to-voltage converter 32. The output voltage from the converter 32 is then fed through an amplifier/filter or other suitable conditioning circuit 34 that generates an audio signal, which is sufficient to drive a pair of headphones 36. It should be understood that any indicator device, such as a visual display, audio speaker, flashing lamp, etc., could be used in place of the headphones 36, although the headphones 36 make a particularly efficient and convenient to use device. A battery power supply 38 is employed to power the electrical elements in the detector 14, although any suitable power supply could be used for this purpose. Finally, and as an option, the function generator 12 and detector 14 can be wired together by means of an electrical cable as illustrated by the dashed line 39. Such an arrangement would, for example, enable the function generator 12 to communicate with the detector 14 to improve the sensitivity of the system 10. For example, the function generator 12 could communicate the exact frequency and nature of the signal to be detected so that the detector 14 could filter out any other signals. However, use of a standalone detector 24 is advantageous because of its resulting portability and convenience.

In the operation of the system 10, the function generator 12 is switched on and selected to generate a chirping audio frequency electrical signal that is applied to the fluid 20 in the pipe 18. This causes the fluid 20 to be repeatedly charged and discharged. Meanwhile, a user, who desires either to locate the pipe 16 or a leak 40 there from, moves the detector 14 along the ground. As long as the pickup plate 26 is not in close proximity to any source of varying voltage or charge, no audio signal will be generated by the amplifier 34 to drive the headphones 36. However, once the pickup plate 26 is passed near the pipe 16 or the leak 40 (e.g., within 10 feet or so), the varying charge in the fluid 20 will induce a similarly varying charge on the pickup plate 26. This in turn will induce a varying current that is fed into the current-to-voltage converter 32, which will cause the amplifier 34 to generate an audio driving voltage to the headphones 36. The user will then hear a chirping sound that indicates that either the pipe 15 or the leak 40 is beneath the pickup plate 26 in the ground. With the circuitry arrangement in the detector 24, the closer the pickup plate 26 comes to the conductive fluid 18, the greater the voltage that will be generated by the amplifier 34 and the louder the resulting audio sound will be from the headphones 36. In the case of the leak 40, the user can easily discriminate between the pipe 20 and the leak 40 because the leak 40 will tend to be more spread out and will thus cause the detector 14 to generate a chirping sound over a larger area than will the pipe 20.

The foregoing method and system for locating pipes and leaks has a number of advantages in situations where a conductive fluid, such as ionized water, is flowing in a nonconductive pipe. In particular, the invention is inexpensive to implement; the components required are all standard and readily available; the system is user friendly since the user simply walks along searching in a fashion similar to using a metal detector; the flow system can be operating while searching for the leak unlike in many other techniques; and the detection capability is not strongly dependent upon the size of the leak as in most other techniques.

Although the invention has been disclosed in terms of a preferred embodiment and variations thereon, it will be understood that numerous additional modifications and variations could be made thereto without departing from the scope of the invention as defined in the following claims.

What is claimed is:

1. A method for detecting location of a conductive fluid comprising the steps of:
   a) applying a time varying charge to a conductive fluid disposed in a non-conductive structure;
   b) providing a charge detector including a capacitive conductive pickup plate for receiving an induced charge that is generated by a charged material in close proximity to, but not contacting said pickup plate, said detector including an indicator device that is responsive to charge that is induced on said pickup plate; and
   c) scanning said detector over an area without contacting said conductive fluid to determine whether said conductive fluid is located in close proximity to said area, based on an output generated by said indicator device in response to detection of said time varying charge in said conductive fluid.

2. The method of claim 1, wherein said step of applying a time varying charge comprises providing a function generator and applying a time varying voltage signal generated by said function generator to said conductive fluid.

3. The method of claim 1, wherein said conductive fluid is contained in a non-conductive pipe and said step of scanning further comprises determining the location of said pipe from the location of said conductive fluid.

4. The method of claim 1, wherein said conductive fluid is contained in a non-conductive pipe and said step of scanning further comprises determining the location of a leak in said pipe from the location of said conductive fluid by determining whether said fluid is detected in a location external to said pipe.

5. The method of claim 1, wherein the step of providing a charge detector further comprises providing a charge detector including a current-to-voltage converter connected to said pickup plate for receiving current there from and generating a voltage, and a conditioning circuit for receiving said voltage and generating a signal for driving said indicator device.

6. The method of claim 5, wherein said charge indicator device comprises a pair of audio headphones and said conditioning circuit generates an audio signal for driving said headphones.

7. The method of claim 6, wherein said step of applying a time varying charge comprises providing a function generator that generates a chirped audio frequency voltage signal and applying said chirped voltage signal to said conductive fluid so that when said pickup plate in said charge detector is scanned in close proximity to said conductive fluid, said conditioning circuit will generate a chirped audio signal for driving said headphones.

8. A system for detecting a location of a conductive fluid in a non-conductive structure comprising:
   a) a charge generator for generating a time varying electrical charge, said charge generator having an output to be connected to an accessible portion of a conductive fluid to be located for applying a time varying charge to said conductive fluid; and
   b) a charge detector including a capacitive conductive pickup plate for receiving an induced charge that is generated by a charged material in close proximity, to but not contacting said pickup plate, said detector including an indicator device that is responsive to charge that is induced on said capacitive pickup plate, whereby, when said detector is scanned over an area to determine whether said conductive fluid is present, said indicator device will generate an indication when said pickup plate is in close proximity to, but not contacting said conductive fluid.

9. The system of claim 8, wherein said charge generator comprises a function generator that generates a time varying voltage output.

10. The system of claim 9, wherein said function generator generates a chirped audio frequency signal output.

11. The system of claim 8 wherein said charge detector further comprises a current-to-voltage converter connected to said pickup plate for receiving current there from and generating a voltage, and a conditioning circuit for receiving said voltage and generating a signal for driving said indicator device.

12. The system of claim 11, wherein said charge indicator device comprises a pair of audio headphones.

13. The system of claim 12, wherein said charge detector further includes a ground plane plate connected to said current-to-voltage converter and disposed parallel to said pickup plate for shielding said pickup plate from extraneous charge that is generated by sources other than the conductive fluid to be detected.

14. The system of claim 8, wherein said charge detector includes a portable handheld housing in which said pickup plate is disposed.

15. The system of claim 8, wherein said charge generator and said charge detector are connected to one another to facilitate communication between said charge generator and said charge detector.

16. The system of claim 8, wherein said pickup plate is a flat, rectangular plate.

17. A system for detecting location of a conductive fluid in a non-conductive structure comprising:
   a) a function generator for generating a time varying voltage output, said function generator having an output to be connected to an accessible portion of a conductive fluid to be located for applying a time varying charge to said conductive fluid; and
   b) a charge detector including:
      1) a portable handheld housing:
      2) a flat capacitive conductive pickup plate in said housing for receiving an induced charge that is generated by a charged material in close proximity to, but not contacting said pickup plate;
      3) a current-to-voltage converter connected to said pickup plate for receiving current there from and generating a voltage;
      4) a conditioning circuit for receiving said voltage from said current-to-voltage converter and generating an output signal; and
      5) an indicator device for receiving said output signal and generating an output indication when a time varying charge is induced on said capacitive pickup plate,
      whereby, when said detector is scanned over an area without contacting said conductive fluid to determine whether said conductive fluid is present, said indicator device will generate an indication when said pickup plate is in close proximity to, but not contacting said conductive fluid.

18. The system of claim 17, wherein said function generator generates a chirped audio frequency signal output.

19. The system of claim 17, wherein said charge indicator device comprises a pair of audio headphones.

20. The system of claim 17, wherein said charge detector further includes a flat ground plane plate connected to said current-to-voltage converter and disposed in said housing parallel to said pickup plate for shielding said pickup plate from extraneous charge that is generated by sources other than the conductive fluid to be detected.

* * * * *